May 4, 1965 D. R. BAUER ETAL 3,181,279
METHOD AND DEVICE FOR PRODUCING PATTERNED-SURFACE SHEET MATERIAL
Filed Jan. 29, 1962 5 Sheets-Sheet 3

DONALD R. BAUER
JOHN D. CASSIDY
HOWARD W. HANCE
CLARENCE R. MULLEN
INVENTORS

BY James E. Toomey

ATTORNEY

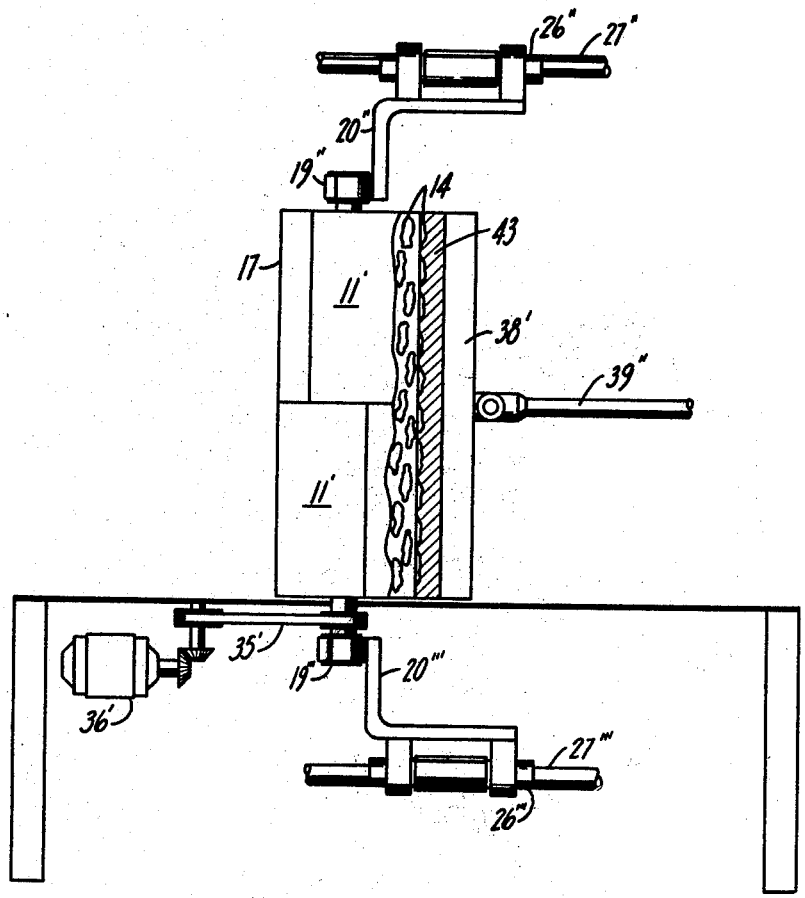
FIG_5
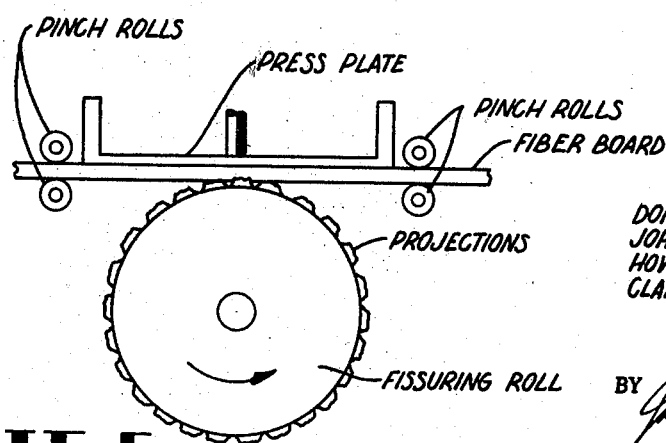
FIG_6
DONALD R. BAUER
JOHN D. CASSIDY
HOWARD HANCE
CLARENCE RICHARD MULLEN
INVENTORS

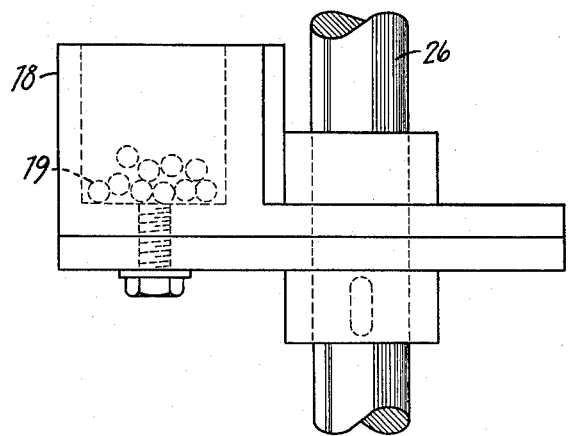
FIG_7

United States Patent Office 3,181,279
Patented May 4, 1965

3,181,279
METHOD AND DEVICE FOR PRODUCING PATTERNED-SURFACE SHEET MATERIAL
Donald R. Bauer, John D. Cassidy, and Howard W. Hance, St. Helens, and Clarence R. Mullen, Portland, Oreg., assignors to Kaiser Gypsum Company, Inc., Oakland, Calif., a corporation of Washington
Filed Jan. 29, 1962, Ser. No. 169,489
17 Claims. (Cl. 51—90)

This invention relates to the production of an ornamental or sound-absorbing panel or tile and to an apparatus and means for making such a product.

There have been many methods and devices proposed in the past for making textured or sound-absorbing wall surfacing units such as panels, tiles and the like. Some of the earliest of these units were drilled or punched to increase sound-absorbing capacity, but the appearance of the products made in such manner has not been very pleasing or decorative. With the object of making more decorative products, which still exhibit good sound-absorbing qualities, the art has resorted to the production of fissured openings in the panel surface. Various methods of production of fissures have been proposed. For instance, it has been proposed to form the openings by disturbing the arrangement of the fibers while a fibrous sheet is still in the wet state, after which the sheet is pressed to reduce thickness and water content. Such an operation has been found to reduce the size and effectiveness of the formed fissure-like openings. Various other methods and means have been heretofore developed but have had certain disadvantages, such as being more costly, or inefficient with regard to the production of sound-absorptive ratings or capacity, or necessitating separate treatment of each tile blank, or as incorporating hazards to workers in the production line.

It has generally been recognized in the past that merely cutting or sawing of the fibers in a formed cellulose fibrous panel does not produce a satisfactory appearance or sound-absorption and this occurs even though the fibers are subsequently pulled apart to form openings. In the finished board, the fibers tend to rearrange themselves under the influences of pressure or high humidity, reducing the size and effectiveness of the openings.

According to the present invention, there is now provided a method and means for forming fissured openings in the surface of a fibrous sheet, such as a panel or tile, whereby such openings are permanent and stable, and provide a decorative appearance and acoustical properties, while at the same time the method provides substantially debris-free fissures. The method of this invention is preferably applied to the surface of a formed and dried sheet, so that no further mechanical processing of the surface or the sheet is required, except that the surface can, if desired, be painted or otherwise coated.

In the accompanying drawings there are shown various embodiments of apparatus according to the present invention and adapted to carrying out of the method of the present invention, to produce the product thereof. In the drawings:

FIGURES 5, 6 and 7 show other embodiments of and variations in the device of the present invention.

The method and device of this invention are suitable for making fissured openings, or fissures, in blanks of felted cellulose fibers, such as those derived from wood chips in the known way, or of mineral fibers, such as mineral wool, glass wool, rock wool, or glass fibers or of any desired mixture of such fibers, to provide decorative, patterned sheets.

The blank or tile is maintained in contact with patterned abrasive or cutting projections of a projection-bearing surface or base and at the same time there is produced relative orbital motion between the blank and the projection-bearing surface. In a preferred mode of continuous operation, a drum is provided on its surface with a plurality of the contoured or patterned abrasive or cutting projections and the projection-bearing surface is caused to move in an orbital path while the drum rotates and a fibrous blank is held in grinding contact with the projections whereby fissures are cut or formed in the fibrous blank surface, such fissures penetrating the blank to less than its total thickness. This mode of operation and embodiment will be described below, particularly as applied to a lignocellulose blank, but it is to be understood that other fibrous blanks are useful in this invention.

Figure 1:
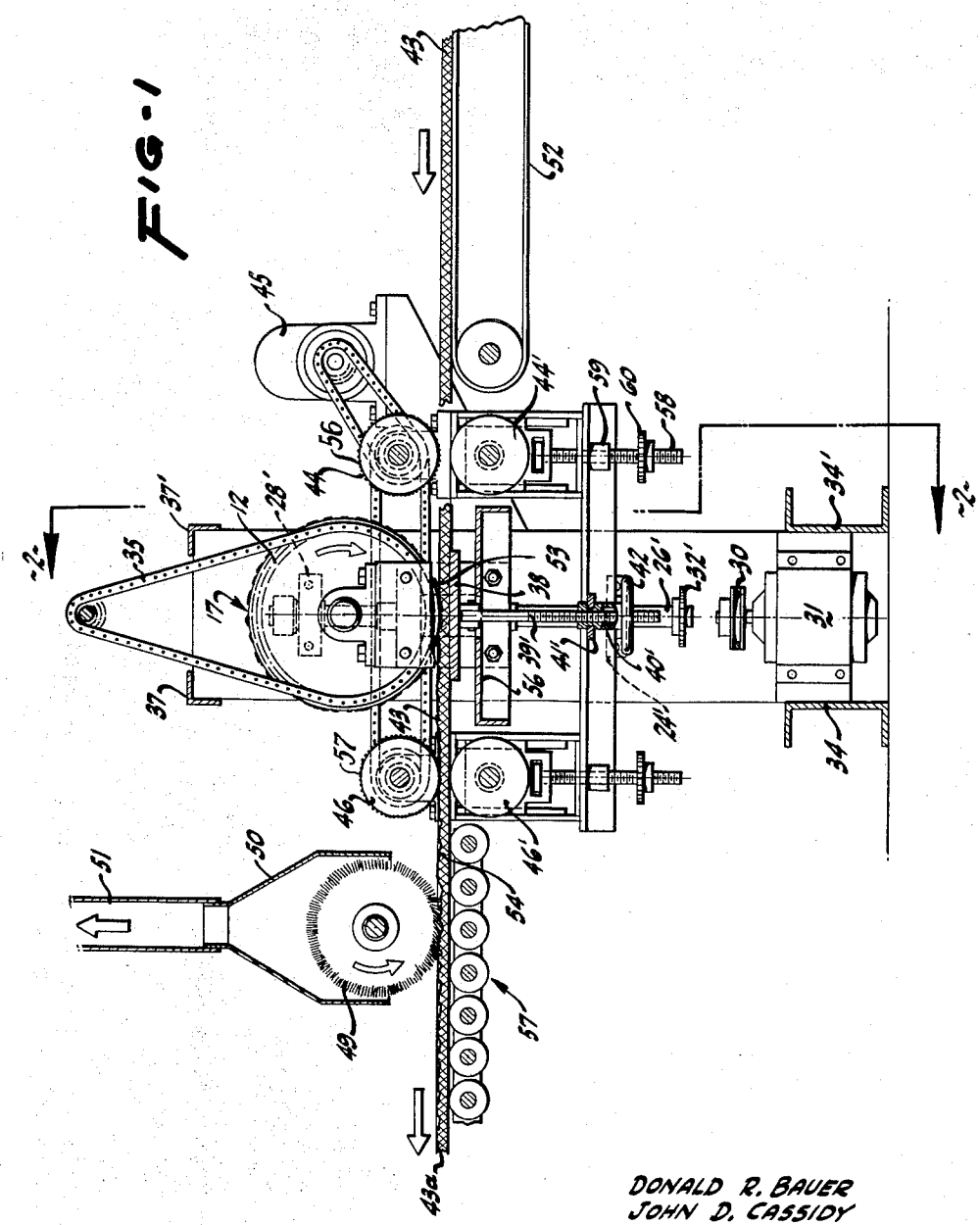
FIGURE 1 is an end view of one device according to the invention, taken on line 1—1 of FIGURE 2.
Figure 2:
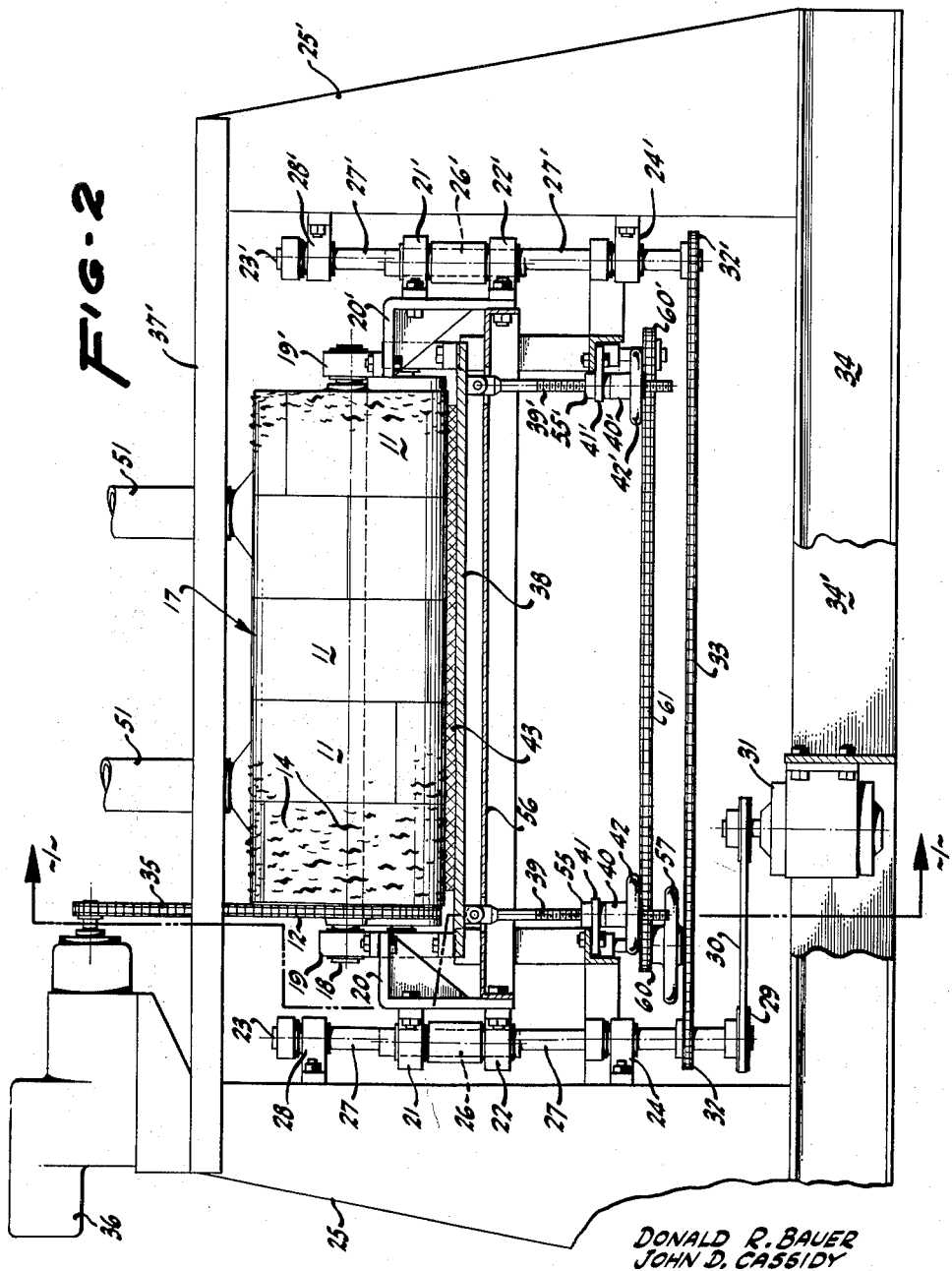
FIGURE 2 is a side view of the device of FIGURE 1, taken on line 2—2 of FIGURE 1.
Figure 3:
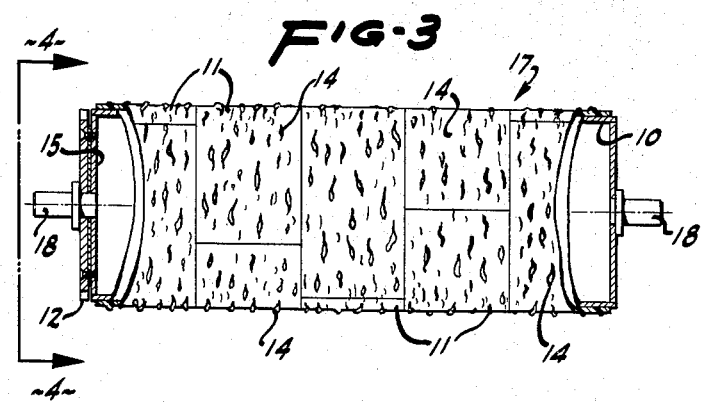
FIGURE 3 is a detail view of one embodiment of a fissuring drum.
Figure 4:
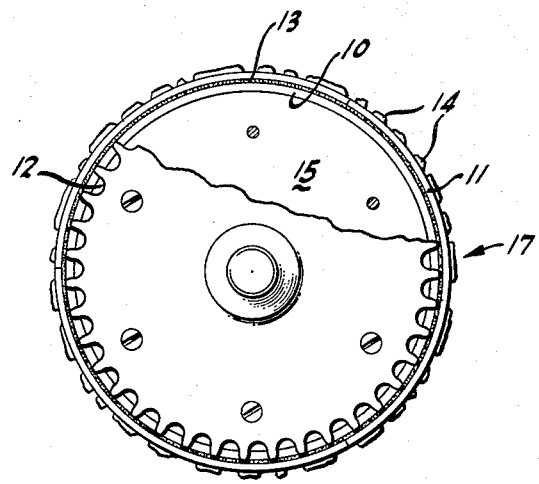
FIGURE 4 is an end view of the fissuring drum of FIGURE 3, taken on line 4—4 of FIGURE 3.

A lignocellulose blank is provided by digesting wood chips, then disintegrating into a mass of loose, individual fibers, forming a water slurry of such fibers with addition of suitable sizing and then forming into a fibrous sheet on a board machine, such as a Fourdrinier or Oliver machine, all in the manner known to the art. The water is drained and expressed from the sheet and it is then pressed to desired thickness, usually ½ to 1 inch thickness, and is dried at elevated temperature, generally from 260° F. to 450° F. The fissuring of this sheet will be described with respect to the drum-including apparatus of annexed FIGURES 1 to 4.

In the embodiment shown in such figures, a fissure-forming drum is provided which comprises a tubular metal shell 10 to which are affixed a plurality of projection-bearing panels 11. At one end of the drum is affixed sprocket 12 which enables rotation of the drum as will be later described. Panels 11 are affixed to shell 10 by means of an interposed layer of adhesive 13, which is any suitable adhesive such as a rubber contact cement, an epoxy resin adhesive or similar resin adhesive, as desired. The panels 11 are suitably of metal or of a plastic such as synthetic resinous plastic, as will be further described below. Where metal is employed, the panels can be alternatively affixed to the drum by bolts, screws or other suitable means.

The projections 14 are preferably formed on the base or panel in a preliminary step and the projection-bearing panel is then affixed to the shell 10. When panel 11 is of metal it is preferably formed in arcuate shape to conform to the curvature of the surface of shell 10 but if metal panel 11 is sufficiently thin and flexible it can be bent and shaped to shell 10 when applied thereto. Where projections 14 are formed of metal, they are provided with burred surfaces or similar cutting surfaces.

The cutting or abrasive projections are provided with contoured surfaces and are, in effect, negative fissures. In other words, the projections are irregular in shape and are patterned bosses. The projections of the above description are termed herein for convenience "contoured projections" and it is to be understood that these are the projections upon any of the projection-bearing surfaces referred to herein. The projections are disposed on the base or surface in a random or patterned design depending upon the design desired in the fissured tile or panel. The preparation of metal projections has been described above. It has been found most convenient, economical and suitable to employ plastic panels bearing plastic projections provided with abrasive grains at least at their surfaces.

In producing the plastic panels described, a mold is prepared which is a shallow receptacle, preferably rectangular in plane surface, having in its base a plurality of fissure-like depressions conforming in size, depth and distribution to the fissures and pattern desired in the finished tile or panel. In a preferred operation, to form a fissuring drum surface, a batch of granules is prepared, containing abrasive grains, and a plastic or resin such as described below. The batch contains a major porportion of such grains, sufficient to ensure abrasive action throughout the formed mass filling the depression, and particularly at the surfaces of the patterned or contoured projections or protuberances formed thereby. It is preferred to employ a mixture of coarser and finer grain sizes, suitably a coarse size of between passing 20 mesh to retained on 28 mesh, and a fine size of between passing 46 mesh and retained on 60 mesh, there being employed a major portion of finer sized and a minor portion of coarser size for greatest strength and longest life of the abrasive projections. Suitably, e.g., there is employed a mixture of three parts by weight of corundum passing 46 mesh and one part by weight of the same material passing 20 mesh.

After the depressions are filled with the abrasive grain and plastic mix, a moldable plastic or resin is cast into the receptacle filling the receptacle to the desired depth of sheet or panel. The plastic is the same as, or is compatible with that of the granule mix, so that the protuberances bond to the panel base and form a continuous sheet or panel structure, as shown, e.g. in FIGURE 3. A suitable plastic or resin for use in the above granule mix is an epoxy resin which is a reaction product of epichlorohydrin and bisphenol A, such as a Gen Epoxy resin manufactured and sold under this name by General Mills, Inc. or Epon 820 resin, made and sold by Shell Chemical Corp. Such a plastic or resin is employed in liquid state and in this use is compounded in the manner well known to the plastic or resin art, with the addition of a small amount, about 25%, of finely divided clay or such suitable filler and about 60% of an agent such as Versamide, a condensation product of polycarboxylic acid and polyamine, made and sold by General Mills, Inc., and the cast panel is cured and hardened being so cured, if desired, at increased temperatures. Alternatively, there can be used a phenolic resin, synthetic rubber latex or other like moldable plastic material to form a flexible or deformable sheet.

As abrasive grains there can be employed silicon carbide, corundum, tungsten carbide, glass chips, diamond dusts or any other desired abrasive granular or particulate material. When molding with the resinous or plastic base material, the abrasive grains may tend to fall to the bottom of the depressions or may be uniformly admixed through the plastic. When the hardened projection-bearing panel is removed from the mold the grains in one embodiment are disposed at the surfaces of the contoured projections; but in a preferred mode of operations, the grains are dispersed throughout the entire projection or base. The plastic panels so formed bear projections generally conforming in relief to the contour and depth of the desired fissures and to install are easily conformed to the surface of shell 10 by warming the panel slightly, e.g., to about 150° F., and bending to fit onto the shell. A layer of adhesive, preferably rubber contact cement, is first applied, suitably to both panel and shell. Any desired adhesive which is compatible with the resin of the panel, or adhesion of metal to metal, can be employed.

In the embodiment shown in FIGURES 1 to 4, drum 17 is disposed on and affixed to horizontal shaft 18 which projects from the drum at both ends and is supported by bearings 19, 19', angle irons 20 and 20', which are bolted or otherwise affixed to cross-frame piece 56, and by bearings 21, 21' and 22, 22', vertical shafts 23, 23' and bearings 24, 24', 28 and 28', affixed to upright frame elements 25, 25', respectively. Disposed opposite each end of drum 17 are vertical shafts 23, 23'. Each shaft has a central cylindrical portion 26, 26' of larger diameter and upper and lower cylindrical end portions 27, 27' of smaller diameters, the upper and lower ends being, if desired, of equal diameters. The vertical axis of the central portion in each shaft is offset from the vertical axis of the upper and lower end portions and it will be understood that the amount or horizontal distance of such offset will determine the size and shape of the fissured opening formed in the tile or panel. It has been found suitable for general operation to provide such an offset of about $\frac{1}{32}$ to $\frac{1}{16}$ inch, preferably $\frac{3}{64}$ inch. These shafts are supported by bearings 24, 24' and 28, 28', the bearings being affixed to the frame elements. Sprocket 12 of drum 17 is connected by way of chain 35 to motor 36, supported on frame end element 25 and top cross frame elements 37, 37'.

Disposed on the lower end 27 of shaft 23 is pulley sheave 29 connected by way of belt 30 to motor or source of motive power 31 disposed between bottom cross-frame members 34, 34'. Also affixed to portion 27 of shaft 23 is sprocket 32 connected by timing belt 33 to a corresponding sprocket 32' on shaft 23' at its lower end 27', so that shafts 23 and 23' turn at the same rate. As motor 31 rotates shaft 23–27, this rotation is communicated to shaft 23'–27'. As shafts 23 and 23' rotate, the larger central portion 26, 26' of these shafts are rotated about an axis of rotation displaced from that of portions 27, 27', and cause an oscillatory motion thereby in bearings 21, 21' and 22, 22', and also in angle irons 20, 20' affixed to said bearings and in bearings 19, 19' which are affixed to the angle irons and also to horizontal shaft 18, to which is affixed drum 17. Thereby the horizontal oscillatory, orbital motion is effected in drum 17.

Attached to one end of drum 17 is sprocket 12, which is connected to a source of power such as motor 36 by means of chain 35, to cause rotation of drum 17. It can be seen, therefore, that horizontal oscillatory, orbital motion and rotation can be simultaneously effected in the drum; and projections 14 on the drum surface move in an orbital path or have orbital motion.

Disposed directly beneath drum 17 is horizontal pressure plate 38, supported by rods 39, 39' which are threadedly connected to supporting brackets 41, 41' by threaded bushing and thrust collars 55, 55'. Tubes 40, 40' are affixed to collars 55, 55' and terminate in hand wheels 42, 42', which upon turning will rotate bushings 55, 55' in brackets 41, 41' and thereby effect raising or lowering of the press plate 38 by the raising or lowering of rods 39, 39', each of the latter being connected to press plate 38 in any desired manner, e.g. by a clevis connection, in the embodiment shown in FIGURES 1 and 2. Press plate 38 is thereby adjusted so as to maintain a sheet or tile 43 in contact with abrasive projections 14.

Disposed ahead of drum 17, is a pair of drive or friction rolls, 44, 44'; the top roll 44 being driven by a variable speed motor 45 of the type well known to the art, to cause panels or tiles 43 to move forward at the same lineal rate as the rotating surface of drum 17. Roll 44 is vertically adjustable, e.g. by hand wheel 57 and threaded shaft 58 passing through threaded collar 59 as shown and connected by chain 61 and sprocket 60 to like sprocket and shaft at the other end of the roll. Collar 59 is affixed to supporting frame 25, 25' (this arrangement being the same at each end of the roll), and threaded shaft 58 is connected at its upper end in a conventional manner to a journal support which slides between vertical portions of the frame and which supports one end of rolls 44 and 44', respectively. Rolls 46 and 46' are supported and adjusted in like manner. This arrangement is conventional.

Disposed behind drum 17 is a second pair of drive rolls 46, 46'; 46 being likewise actuated by variable speed motor 45 in series with drive roll 44. Rolls 46, 46' receive the treated board from the drum 17—plate 38 disintegrating station and drive it forwardly under rotating brush 49 actuated by any desired source of power (not shown) and over roller conveyor 57. Above brush 49, rotating in a direction counter to the travel of the sheet, are one or more hoods 50 and attached thereto stacks 51 to remove fibrous and other debris brushed out of sheet 43a at the cleaning station. Such debris is then carried to a dust-collection system. In this example, two such hoods and stacks are shown. In the hood system is a suction or blower means for exerting a suction action to assist in removing finely divided debris.

In carrying out the method of this invention, a board or other blank 43, such as a cellulose fiber board of the type known as FirTex, which may have been painted or otherwise coated, if desired, is fed into pinch rolls 44, 44' by means of conveyor belt 52 of the usual type known to the art. Rolls 44, 44' are adjusted to forward the treated blank to the grinding station where it is received on pressure plate 38 and pressed against projections 14 on drum 17. Motor 31 will have been actuated and the abrasive projections move in an orbital motion, as described above, against the surface of blank 43, being gradually forced downward from first contact with the blank, e.g. at 53, to their deepest penetration at the lowest point of travel of the surface of the drum and then being raised out of contact with the blank as the drum rotates.

The blank with its locally disintegrated surface portions filled with debris, and raised at the edges, as at 54, is received by pinch rolls 46, 46' and forwarded to brush roll 49 which brushes away the debris and brushes off any raised portions, and the freed fibers and dusts are drawn upwardly through the stack and hood arrangement, cleaning the blank and likewise preventing dust hazards for the workers. For best results in fissuring, a continuous sheet is treated, so that at the feed end it is firmly held by pinch rolls 44, 44' and at the discharge end it is simultaneously firmly held by pinch rolls 46, 46'. The sheet is thus held firmly against any tendency to move with the fissuring projections. The fissured blank can be painted, and if higher acoustical properties are desired, it is suitably punched or drilled. In one mode of operation, to produce a particularly pleasing effect, the depths of the fissures are painted with one color and the un-disintegrated or flat portions of the blank surface are painted with a contrasting color or a different tint of the same color. In a further mode of operation, the fissured blank surface is, if desired, punched or drilled with holes. For example, such holes can penetrate toward but do not pierce the back surface of the blank or alternatively, may pierce such back surface. The holes, in one embodiment are arranged in a repetitive pattern consisting of a series of concentric circles with radiating lines extending from the outermost circle.

In another mode of operation, the grinding roll can be vertically disposed and the blank passed vertically in contact with the abrasive projections, but for convenience and economy the above-described apparatus has been found advantageous.

The fissured article produced by the present method has a pleasing decorative appearance and it has also acoustical or sound-absorbing properties. It is an advantage of the method that no chemical pre-treatment of the fibrous surface is necessary and it is a further advantage when working on a dry cellulose fiber blank that the fibrous material is removed and not merely displaced so that upon further subjection to either pressure or humidity or both, the fibers do not tend to re-arrange themselves so as to close the fissures. It is a further advantage that there is no deposition of foreign solids, such as abrasive or metal in the fissured openings; and a still further advantage that the cut fiber ends increase sound absorption of the article. It is also an advantage of this invention that the machine is economical and safe to operate, and that the method is inexpensive, the working life of the fissuring projections or bosses being very long. It is a particular advantage of the continuous mode of operation which is one embodiment of the present invention that sheets or panelling of great length, or continuous sheets or panelling, can be fissured and that it is not necessary to treat one small or conventional tile-sized blank at a time. Such continuous operation has substantial economic and time-saving advantages; and it has the particular advantage in operation using the device of FIGURES 1 to 4 that the sheet or panel is firmly gripped by both pairs of pinch rolls, e.g. 44, 44' and 46, 46', so that the blank is firmly held during the grinding operation.

Holes can be drilled or punched in the fissured articles produced according to the present invention, to increase the acoustical properties thereof. The mesh sizes given herein are Tyler screen sizes as shown in "Chemical Engineers' Handbook," Second Edition, page 1719 (1941), published by McGraw-Hill Book Company. Bisphenol A as referred to herein, is the common commercial name for 4,4'-dihydroxy - diphenyl - dimethyl - methane. Although the invention has been described as applied to cellulose fiber boards, it will be understood that it can also be applied to boards of other fibrous material as disclosed herein. In the above description, the fissuring roll has been shown as disposed above the blank to be treated but it will be understood that this roll could alternatively be disposed below the blank. FIGURE 6 shows schematically such an arrangement. In such manner of operation, tapping or vibration will assist in the removal of debris from the fissures, the treated surface facing downwardly. In still another embodiment, the fissuring roll and the pinch rolls can be vertically disposed so that the board goes through on an edge. This arrangement is shown somewhat schematically in FIGURE 5 where corresponding elements are given like numerals to those shown in the preceding figures. In the embodiment shown above, the brushes used contain 20% nylon fibers, the remainder being broom fibers. In a preferred device all of the pinch or drive rolls, e.g. 44, 44', 46, 46', have knurled surfaces. This is shown for example at 56 and 57 on rolls 44 and 46 respectively in FIGURE 1. It is preferred also in the embodiments shown in FIGURES 1 to 4, that the brush be adjustable vertically because boards or tiles of various thicknesses can be treated by such device.

In a variation of the invention as above described it will be understood that, if desired, the blank can be forwarded at a lineal speed which differs from that of the drum surface, whereby the shape and size of the fissures produced in the blank are also varied. It has also been found advantageous to counterbalance the rotating shaft portions 26, 26', in the above-described device, in order to reduce vibration of the whole machine. This is effected, for example, by affixing a suitably weighted means to each of portions 26 and 26' between brackets 21 and 22 and 21' and 22' respectively and at a portion of the shaft surface opposite the rotating axis of each portion 26, 26'. Portions 26 and 26' can be described as enlarged, eccentrically disposed portions of shafts 23, 23' respectively. A suitably weighted means can be, for example, a kidney-shaped metal cup attached to each shaft at the point noted and containing a charge of lead. Such an arrangement shown in FIGURE 7 where the metal cup 78 bearing lead shot 79 is attached to shaft 26.

Having now described the invention, what is claimed is:

1. Device for forming fissure-like openings in a fibrous surface which comprises in combination a pair of rolls adapted to frictionally engage and forward a flat fibrous blank, a rotatable drum, a projection-bearing plastic coating on said drum, abrasive grains embedded in the surfaces of said plastic projections, means for rotating said drum, means for moving said drum in an orbital path, means for holding said blank in grinding contact with said projections whereby said abrasive grains disintegrate portions of the surface of said blank, and means for removing said distintgrated portions.

2. Device as in claim 1, wherein said removing means is a rotating brush.

3. Device as in claim 1, wherein said drum is covered with a plurality of abrasive-coated projection-bearing plastic sheets.

4. Device as in claim 3, wherein said plastic is a resinous polymer of a reaction product of epichlorohydrin and bisphenol A.

5. Device for forming fissure-like openings is a surface which comprises in combination a pair of forwarding rolls to frictionally engage and forward a flat work-piece, a projection bearing rotatable drum in sequence with said rolls and orbitally movable, a plate disposed adjacent said drum and adapted to receive said work-piece from said rolls and to hold said work-piece in contact with projections on said drum, means for moving said drum in a restricted orbital path, means for rotating said drum and moving said work-piece at the same relative speeds, and abrasive projections on the surface of said drum and adapted to disintegrate portions of the surface mass of said work-piece to form fissures therein.

6. Device for forming fissure-like openings in a work-piece surface which comprises a projection-bearing base, a means adjacent said projection-bearing base for holding a work-piece against said projections, cutting projections disposed in patterned design on said base and adapted to cut fissures in portions of the surface mass of said work-piece, and means for causing relative orbital movement of said projection-bearing base and said work-piece holding means.

7. Device for forming fissure-like openings in a work-piece surface which comprises in combination a pair of forwarding rolls to frictionally engage a work-piece, a projection-bearing rotatable drum in sequence with said rolls, means adjacent said drum adapted to receive said work-piece from said rolls in frictional engagement, means for moving said drum in an orbital path, means for rotating said drum and forwarding said work-piece at the same relative speeds, and projections on said drum adapted to disintegrate portions of the surface mass of said work-piece to form fissures therein.

8. Device for forming fissure-like openings in a fibrous surface which comprises in combination a pair of forwarding rolls to frictionally engage a continuous fibrous sheet, a projection-bearing rotatable drum in sequence with said rolls and rotatable on an axle, means adjacent said drum adapted to frictionally engage and receive said sheet from said rolls, means for moving said drum axially and means for moving said drum perpendicular to the axis in a reciprocating motion whereby to impart orbital motion to said drum, means for rotating said drum, projections on said drum adapted to cut said fibrous surface, and means for holding said sheet in contact with said projections.

9. Device for forming fissure-like openings in a fibrous surface which comprises in combination a pair of rolls adapted to frictionally engage and forward a flat fibrous work-piece, a rotatable drum adjacent said rolls, a plurality of plastic sheets adhesively attached to said drum, a plurality of projections on the surfaces of said sheets, abrasive grains embedded in said projections and adapted to disintegrate said fibrous surface, means for rotating said drum and for advancing said work-piece at the same relative speeds, means for moving said drum in an orbital path, means for holding said work-piece in contact with said projections whereby said abrasive grains cut away portions of said fibrous surface, and means for removing said cut away portions.

10. Device for forming fissure-like openings in a fibrous surface which comprises in combination a pair of rolls adapted to frictionally engage and forward a flat fibrous work-piece, a rotatable drum adjacent said rolls, a plurality of plastic sheets adhesively attached to said drum, a plurality of projections on the surfaces of said sheets, abrasive grains embedded in said projections and adapted to disintegrate said fibrous surface, means for rotating said drum and for advancing said work-piece at the same relative speeds, means for moving said drum in an orbital path, means for holding said work-piece in contact with said projections whereby said abrasive grains cut away portions of said fibrous surface, a pair of rolls to receive and frictionally engage said work-piece from said drum, and means for removing said cut away portions.

11. Device for forming fissure-like openings in a fibrous surface which comprises in combination a pair of knurled rolls to engage and forward a continuous fibrous sheet work-piece, a horizontal rotatable drum adjacent said rolls, a plastic coating on said drum, projections on said coating, abrasive grains embedded in said projections on said coating, means for moving said drum orbitally along its axis, means for rotating the surface of said drum and means for moving said work-piece at the same lineal rate of speed, a pair of knurled rolls adjacent the discharge from said rotatable drum to receive and frictionally engage said work-piece, an adjustable plate parallel to the axis of said drum and beneth said work-piece and adapted to press said work-piece against said projections, means for moving said drum in a horizontal orbital path whereby said abrasive projections grind said fibrous surface in fissured patterns, and means adjacent said last-mentioned pair of knurled rolls to remove debris from said fissured patterns.

12. Device as in claim 11 wherein said debris-removing means comprises a rotating brush and a suction means.

13. A device for forming fissure-like openings in the fibrous surface of a fibrous sheet which comprises in combination a pair of rolls adapted to frictionally engage and forward a flat continuous fibrous work-piece, a rotatable drum adjacent said rolls, a plurality of plastic sheets adhesively attached to said drum, a plurality of projections conforming in relief to the desired fissure shapes disposed on the surfaces of said sheets, abrasive grains embedded in said projections and adapted to disintegrate said fibrous surface, means for rotating the surface of said drum and for advancing said work-piece at the same relative speeds, means for moving said drum in an orbital path, means for holding said work-piece in contact with said projections whereby said abrasive grains cut away portions of the said fibrous surface, a pair of rolls adjacent the exit side of said drum to receive and frictionally engage said work-piece in conjunction with said first-mentioned pair of rolls, and means adjacent said second-mentioned pair of rolls for removing said cut away portions.

14. Method of forming fissured fibrous panelling from a blank of fibrous sheet material which comprises maintaining a surface of said blank in contact with a base bearing a plurality of contoured cutting projections, actuating said base to impart orbital motion to said cutting projections relative to said blank, cutting away fibrous material to form fissures in said blank inwardly thereof from said surface, and thereafter removing said cutaway fibrous material.

15. In a method of continuously forming fissured fibrous panelling, the steps which comprise advancing a continuous dry fibrous blank into contact with contoured abrasive grinding projections on a rotating base, rotating said projections at a peripheral speed equal to the rate of advance of said blank, imparting an orbital motion to said projections axially of said base to grind out fissures in said blank, and thereafter removing disintegrated material from said ground fissures.

16. In a method of continuously forming fissured fibrous panelling, the steps which comprise preparing a dry cellulose fiber blank, continuously advancing said blank into contact with contoured abrasive grinding projections on a rotating base, rotating said projections at a peripheral speed equal to the rate of advance of said blank, imparting an orbital motion to said projections axially of said base to grind out fissures in said blank, and thereafter removing disintegrated cellulose material from said ground fissures.

17. Device for forming fissure-like openings in a work-piece surface which comprises a projection-bearing base, contoured cutting projections disposed in pattern design on said base and adapted to cut fissures in portions of the surface mass of said work-piece, a means adjacent said projection-bearing base for holding a work-piece against said projections, and means for causing relative orbital movement of said projection-bearing base and said means for holding a work-piece.

References Cited by the Examiner
UNITED STATES PATENTS

| | | | |
|---|---|---|---|
| 2,265,236 | 12/41 | Kistler | 51—298 |
| 2,559,665 | 7/51 | Reis et al. | 51—298 |
| 2,688,826 | 9/54 | Peckett | 51—90 |
| 2,791,289 | 5/57 | Proudfoot et al. | |
| 2,909,010 | 10/59 | Zelewsky | 51—90 |
| 2,984,312 | 5/61 | Brisley et al. | 181—33 |
| 3,013,937 | 12/61 | Brown et al. | 181—33.11 |
| 3,035,657 | 5/62 | Lemon | 181—33 |

FOREIGN PATENTS 1,260,602   4/61   France.

LESTER M. SWINGLE, *Primary Examiner.*

JOHN C. CHRISTIE, *Examiner.*